United States Patent [19]

Middleton

[11] Patent Number: 4,814,764
[45] Date of Patent: Mar. 21, 1989

[54] APPARATUS AND METHOD FOR WARNING OF A HIGH YAW CONDITION IN AN AIRCRAFT

[75] Inventor: Robin Middleton, Bellevue, Wash.

[73] Assignee: The Boeing Company, Seattle, Wash.

[21] Appl. No.: 913,232

[22] Filed: Sep. 30, 1986

[51] Int. Cl.[4] .............................................. G08B 23/00
[52] U.S. Cl. .................................... 340/967; 244/184; 340/945; 340/963; 340/965
[58] Field of Search ............... 340/945, 963, 965, 967, 340/969, 974, 975; 244/183, 184, 194, 195, 103 W, 179; 73/178 R, 178 T; 364/428, 434

[56] References Cited

U.S. PATENT DOCUMENTS

| | | | |
|---|---|---|---|
| 2,827,621 | 3/1958 | Reichert et al. | 340/969 |
| 3,040,567 | 6/1962 | Brody | 340/967 |
| 3,361,392 | 1/1968 | Doniger et al. | 244/184 |
| 3,792,426 | 2/1974 | Ravenelle et al. | 340/965 |
| 3,814,912 | 6/1974 | Manke et al. | 340/967 |
| 3,815,850 | 6/1974 | Tribuno et al. | 364/434 |
| 4,034,334 | 7/1977 | Allyn | 340/945 |
| 4,094,479 | 6/1978 | Kennedy, Jr. | 244/184 |
| 4,109,886 | 8/1978 | Tribken et al. | 340/967 |
| 4,482,961 | 11/1984 | Kilner et al. | 244/183 |
| 4,648,569 | 3/1987 | Stewart | 340/967 |

FOREIGN PATENT DOCUMENTS 1002903  9/1965  United Kingdom ............... 340/974

*Primary Examiner*—Joseph A. Orsino
*Assistant Examiner*—Brent A. Swarthout
*Attorney, Agent, or Firm*—Hughes & Multer, PS

[57] ABSTRACT

A system for warning the pilot when the aircraft has reached a high yaw condition. A differential in pressure or angle of attack between the port and starboard sides of the aircraft is measured and converted into a measured sideslip angle. If the measured sideslip angle exceeds a predetermined maximum acceptable sideslip angle, a warning device, such as a rudder pedal shaker, is activated. The maximum acceptable sideslip angle is determined as a function of the ability of the aircraft flight controls to counteract a rolling moment generated by the yaw condition.

13 Claims, 2 Drawing Sheets

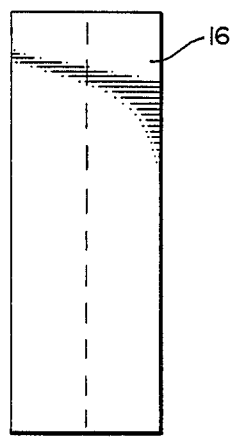
FIG. 2
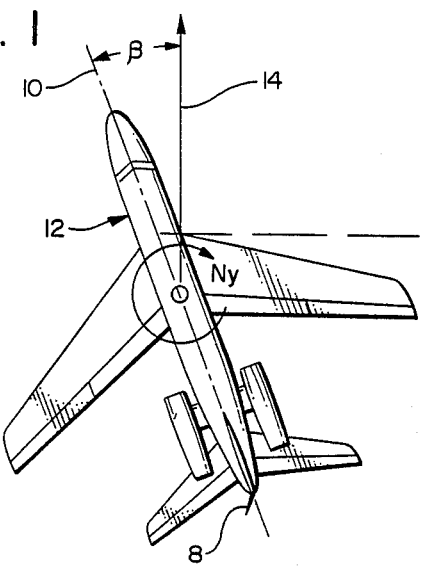
FIG. 1
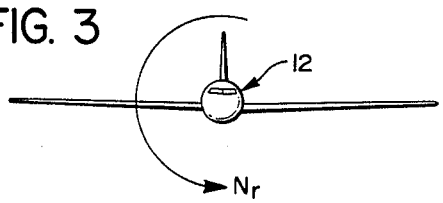
FIG. 3
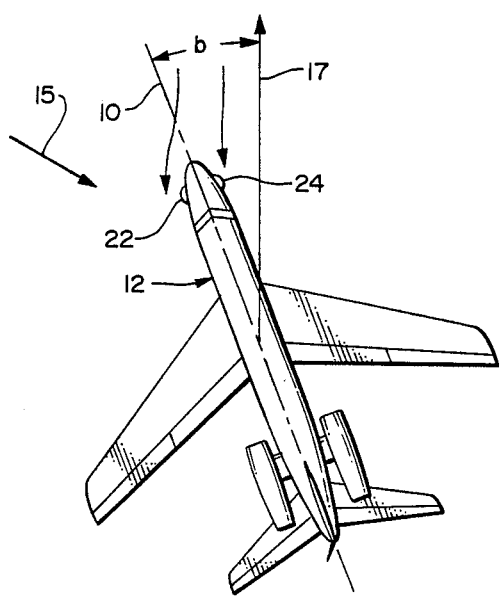

APPARATUS AND METHOD FOR WARNING OF A HIGH YAW CONDITION IN AN AIRCRAFT

TECHNICAL FIELD

The present invention pertains to an aircraft system for warning the pilot when aircraft yaw exceeds selected limits.

BACKGROUND OF THE INVENTION

It is an aerodynamic feature of modern multiengine passenger aircraft to have larger rudder surfaces. This feature is typically necessary in the event one of the engines of the aircraft becomes nonoperational. The remaining operating engines produce a difference in thrust between the left and right sides of the aircraft which cause the aircraft to yaw. By the term "yaw" it is meant that the longitudinal axis of the aircraft is angled to the left or right of the direction of flight; the angular difference between the aircraft heading and the aircraft direction of flight being known as "sideslip angle". The yaw condition is counteracted by the application of opposite rudder by the pilot which reorients the aircraft heading so that the longitudinal axis of the aircraft is aligned with the direction of flight.

It is furthermore a control feature of these aircraft to permit them to be intentionally yawed by the deflection of the rudder. Typically, the pilot will intentionally yaw or sideslip the aircraft just prior to touchdown on landing when there has been a crosswind during the approach. This is because during the approach the aircraft is typically headed in a direction toward the crosswind so that the aircraft will fly a path over the ground in alignment with the runway. However, just prior to touchdown the pilot applies rudder to align the aircraft longitudinal axis with the runway so that during touchdown and rollout the aircraft remains on the runway.

When the rudder is deflected to produce an intentional sideslip, such as during a crosswind landing, the aircraft is caused to rorate about its roll axis due to aerodynamic forces from what is known as "dihedral effect". In order to counteract the rolling of the aircraft, the aircraft pilot applies opposite aileron. It is usually a requirement that the aircraft have sufficient aileron capacity to counteract this rolling moment due to deflection of the rudder in order to maintain the aircraft in level flight.

However, instances may occur when the maximum counteracting rolling moment which can be produced by the ailerons barely counteracts the rolling moment generated by the application of maximum rudder. It is desirable therefore, to provide the aircraft pilot with a warning when the sideslip angle exceeds a selected quantity so that the pilot is aware when the aircraft is approaching a yaw condition which may require maximum counteracting aileron.

Various systems for notifying the pilot of aircraft flight parameters have been disclosed. For example, in U.S. Pat. No. 3,792,426 by Ravenelle et al, there is disclosed apparatus for vibrating the air bladders of a pilot's anti-G suit to warn him of excessive G forces.

Harcum, in U.S. Pat. No. 2,682,042 discloses a signal feeler device associated with the control wheel of an aircraft and which includes a projecting portion which is moved relative to a reference surface to provide the pilot with a tactile indication of aircraft operating conditions.

Hirsch, in U.S. Pat. No. 3,157,853 discloses apparatus for generating linear signals corresponding to aircraft movement along the pitch, roll or yaw axes, as well as rotational measurements of movement about these axes, and for providing tactile information to the pilot which corresponds to the generated signals in order to aid the pilot in controlling the aircraft.

Appartus for providing a tactile sensation to the legs of a pilot as a tactile indicator of changes in pitch, roll or yaw is disclosed by Bennett in U.S. Pat. No. 1,941,533.

A system for alerting a pilot when the aircraft is in an uncoordinated turn is disclosed by Vavra in U.S. Pat. No. 4,484,191, in which the position of a ball bank indicator is sensed, and vibrators are operated in the pilot's seat cushion to correspond to the left or right position of the ball indicator.

Also, in U.S. Pat. No. 2,287,621 by Reichert et al, there is disclosed apparatus for vibrating the rudder pedals of an aircraft to indicate the approach of the aircraft to a stall condition. In Gilson et al, U.S. Pat. No. 4,195,802 there is disclosed a slide member which is operatively connected to the cyclic control of a helicopter and which moves relative to the cyclic control in response to command signals from a flight director to provide the pilot with tactile information of helicopter flight data.

SUMMARY OF THE INENTION

The present invention pertains to a method for warning a pilot of an aircraft of an excessive yaw condition. The method includes the steps of measuring the aircraft yaw condition by measuring the presence of an airflow differential at first and second locations of the aircraft, and then converting the measured airflow differential to a measured sideslip angle. Values of warning sideslip angle as a function of aircraft airspeed are also generated. Then, the measured sideslip angle is compared with the warning sideslip angle which corresponds to the measured aircraft airspeed. When the measured sideslip angle exceeds the warning sideslip angle an error signal is generated, and a warning is provided to the pilot in response to the error signal.

The value of the acceptable sideslip angle as a function of aircraft airspeed is generated by determining first rolling moments generated about a roll axis of the aircraft when the aircraft is at selected sideslip angles and selected aircraft airspeeds, and second rolling moments generated about a roll axis of the aircraft in a direction opposite to the first rolling moments at the selected aircraft airspeeds. The warning sideslip angles are selected from those sideslip angles at which the first rolling moments exceed the second rolling moments.

The present invention also pertains to apparatus for warning a pilot of an aircraft of an excessive yaw condition. The apparatus includes means for measuring the aircraft yaw condition by measuring an airflow differential at first and second locations of the aircraft. Means are also provided for converting the measured airflow differential to a measured sideslip angle, as well as means for generating values of warning sideslip angle as a function of aircraft airspeed. Furthermore, means are provided for measuring aircraft airspeed and for comparing the measured sideslip angle with the warning sideslip angle corresponding to the measured aircraft airspeed. The invention also includes (i) means for generating an error signal when the measured sideslip angle exceeds the warning sideslip angle, and (ii) means, responsive to the error signal, for providing a warning to the pilot.

It is an object of the present invention to provide apparatus and methods for notifying an aircraft pilot of a high yaw condition.

BRIEF DESCRIPTION OF THE DRAWINGS

These and other objects and advantages of the present invention will become more apparent upon reading the following Detailed Description and upon reference to the attached Drawings in which:

FIG. 1 is a schematic representation of an aircraft shown a sideslip angle $\beta$ formed between the longitudinal axis of the aircraft and the direction of flight of the aircraft;

FIG. 2 is a schematic representation of the aircraft which includes port and starboard pressure sensing ports for detecting a pressure differential therebetween which is a function of the aircraft sideslip angle;

FIG. 3 is a front schematic representation of the aircraft to illustrate an aircraft rolling moment $N_r$.

Figure 4:
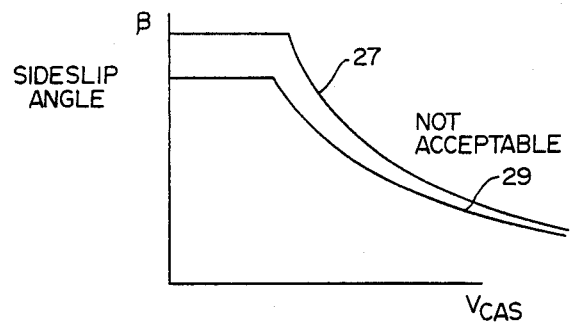
FIG. 4 is an exemplary graph of maximum acceptable sideslip angle and warning sideslip angle as a function of aircraft calibrated airspeed.

While the present invention is susceptible of various mofidications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the claims.

DETAILED DESCRIPTION OF THE INVENTION

The present invention pertains to an aircraft system for warning the pilot of excessive aircraft yaw. However, before proceeding with a Detailed Description of the warning system, a brief discussion of aircraft yaw, the resulting sideslip angle, and their significance to aircraft operation will be provided.

As mentioned somewhat briefly in the Background, it is desirable to provide the pilot with sufficient control of the aircraft to generate a yawing moment about the aircraft vertical axis. As shown in FIG. 1, the generation of a yawing moment $N_y$, typically by deflection of the aircraft rudder 8, causes the aircraft longitudinal axis, designated by a line 10 of an aircraft indicated at 12, to diverge from the direction of flight of the aircraft which is shown by an arrow designated by the number 14. The intersection of the aircraft longitudinal axis 10 and the aircraft direction vector 14 at the aircraft's center of gravity, forms an aircraft sideslip angle $\beta$. As long as the aircraft rudder 8 remains at its commanded deflected position, the selected aircraft sideslip angle $\beta$ will be maintained.

For several reasons it is useful for the pilot to intentionally yaw the aircraft to generate a selected sideslip angle. For example, during a landing approach in which there is a crosswind designed by an arrow 15 in FIG. 2, to a runway 16, the aircraft approach is sometimes flown with the aircraft headed or "crabbed" into the wind so that the path 17 of the aircraft over the ground remains aligned with the runway 16. In this manner, the longitudinal axis 10 of the aircraft forms a crab angle b with the path 17 of the aircraft over the ground. Just prior to touchdown, the pilot aligns the longitudinal axis of the aircraft with the runway by deflection of the rudder so that the aircraft is yawed to generate a sideslip angle $\beta$ which is equal to the aforementioned crab angle b.

Whatever the rudder is deflected, the dihedral effect causes the aircraft to roll about its longitudinal axis 10. As mentioned in the Background, due to the large amount of thrust generated by the modern aircraft jet engines, the rudders of these aircraft are required to be quite large and powerful in order to counteract an unwanted aircraft yaw due to an asymmetrical thrust condition, such as during engine out operation.

During normal flight operation however, such as a crosswind landing, it is possible for the rolling moment $N_r$ (FIG. 3) created by the intentional yawing of the aircraft, caused to deflection of the rudder when aligning the aircraft longitudinal axis with the runway, to approach the maximum counteracting moment $N_r'$ capable of being generated by the aircraft flight controls. This maximum counteracting moment is often referred to as maximum wheel and refers to the maximum rolling moment which can be generated by all of the aircraft lateral control surfaces, such as ailerons, spoilers, flaperons and the like. It is therefore a purpose of the present invention to provide a system for warning the pilot to refrain from further rudder deflection in the event the aircraft is approaching a yaw condition which may require a counteracting moment which approaches or exceeds the aircraft maximum wheel.

Figure 5:
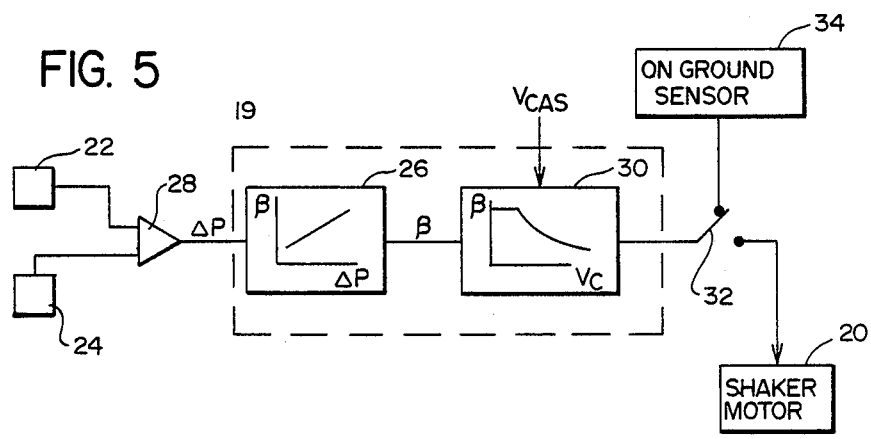
FIG. 5 is a diagram of the elements of the warning system of the present invention.

Broadly, the warning system of the present invention as shown in FIG. 5 includes (i) sensors 22, 24 for sensing and measuring aircraft sideslip parameters, such as a pressure differential between the port and starboard sides of the aircraft, (ii) a computer indicated at 19 for calculating aircraft sideslip angle from the sensed parameters and for generating an error signal when the measured sideslip angle exceeds selected limits, and (iii) apparatus indicated at 20, which are responsive to the error signal, for notifying the pilot when the measured aircraft sideslip angle has exceeded the selected limits.

In an exemplary embodiment of the present invention shown in FIGS. 2 and 5, the aircraft sideslip angle is detected and measured by conventional static pressure sensors 22, 24, which are mounted to the outside of the aircraft toward the aircraft nose at the port and starboard sides, respectively. It is known conventionally that when the aircraft is in a yaw condition there is a difference in pressure $\Delta P$ between the port and starboard sides of the aircraft due to a difference in the velocity of airflow along the port and starboard sides of the aircraft. It is also known that this pressure differential $\Delta P$ is directly proportional to sideslip angle $\beta$.

It should be appreciated that other apparatus for measuring sideslip angle are available, such as a moveable vane which is typically mounted to the outside of the fuselage along the aircraft centerline. The vane is mounted for rotation about the aircraft vertical axis so as to align with the airflow past the aircraft. The change in position of the same vane when the aircraft enters a yaw condition is proportional to the sideslip angle.

The precise relationship between the pressure differential $\Delta P$ and the sideslip angle $\beta$ is dependent upon specific aircraft shape. This relationship is typically determined quantitatively by wind tunnel testing. The quantitative relationship of $\beta$ versus $\Delta P$ is stored in a lookup table 26 (FIG. 5) in computer 19 in order to output a value of the sideslip angle $\beta$ corresponding to the measured input $\Delta P$. Computer 19 includes a differential amplifier 48 which receives the pressure inputs from the pressure sensors 22, 24 via transducers (not shown) and which generates a $\Delta P$ output which is then fed to the lookup table 26.

It is known that the dihedral effect which produces the rolling tendency of the aircraft due to a yawing condition, varies as a function of the aircraft calibrated airspeed for a constant sideslip angle. That is, as aircraft calibrated airspeed increases, and sideslip angle is held constant, the resulting rolling moment also increases. Likewise, a decrease in aircraft calibrated airspeed for a constant aircraft sideslip angle, reduces the rolling moment caused by the dihedral effect. Whether a measured sideslip angle $\beta$ exceeds selected control limits depends upon the following which are determined from aircraft wind tunnel and flight test data: (1) the measured aircraft calibrated airspeed $V_{CAS}$, (2) the measured sideslip angle $\beta$, (3) the resulting rolling moment $N_r$, which is generated while at the selected sideslip angle $\beta$ and while at the selected calibrated airspeed $V_{CAS}$, and (4) a determination whether the maximum wheel of the aircraft is capable of producing a rolling moment $N_r'$ to counteract the rolling moment $N_r$ generated when the aircraft is yawed. More specifically, wind tunnel and flight tests are performed at selected sideslip angles between about 0° and about 20° and at selected calibrated airspeeds between about 100 knots and about 400 knots, to determine the generated rolling moments $N_r$. Tests are also performed at the aforementioned selected airspeeds to determine the rolling moments $N_r'$ generated by application of maximum wheel.

In FIG. 4 there is shown an exemplary graph of (i) maximum acceptable sideslip angle, $\beta_{ACC}$, as a function of aircraft calibrated airspeed, $V_{CAS}$, which is designated by a number 27, and (ii) sideslip angle at which a warning is initiated as function of aircraft calibrated airspeed and which is designated by a number 29. Maximum acceptable sideslip angle is that at which maximum wheel is exceeded; i.e. those values of $\beta$ where from the aforementioned wind tunnel and flight test data, $N_r$ exceeds $N_r'$. In the present invention, the warning sideslip angle $\beta_W$ is less than $\beta_{ACC}$ in order to provide a warning in the pilot prior to reaching $\beta_{ACC}$. A warning differential $\Delta \beta = \beta_{ACC} - \beta_W$ is set in a manner that $\Delta \beta$ decreases with increasing $V_{CAS}$. Typically, $\Delta \beta$ is about ten percent of $\beta_{ACC}$ and is a function of average pilot response time and aircraft response rate to a control input. In FIG. 4, the maximum acceptable sideslip angle $\beta_{ACC}$ is largest at lower aircraft airspeeds. However, at higher calibrated airspeeds, the maximum acceptable sideslip angle decreases because a greater rolling moment $N_r$ is generated at higher airspeeds than at lower airspeeds when the sideslip angle remains the same.

Referring now to FIG. 5, a more detailed description of the warning system is provided. As the pressures are measured at sensors 22, 24 and their difference $\Delta P$ amplified by the differential amplifier 28, the measured sideslip angle $\beta_M$ corresponding to the measured $\Delta P$ is obtained from the lookup table at block 26; this relationship having been entered in computer 19 as a result of previous flight test data which is aircraft type dependent. After $\beta_M$ is generated, this value together with the present aircraft calibrated airspeed $V_{CAS}$ is fed to a lookup table 30 which stores the values of warning sideslip angle $\beta_W$, as a function of aircraft calibrated airspeed. At block 30 a determination is made whether the measured sideslip angle $\beta_M$ exceeds the warning sideslip angle $\beta_W$ for the measured $V_{CAS}$. That is, the measured $V_{CAS}$ and measured $\beta$ locate a point on the $\beta$ vs. $V_{CAS}$ graph. If this point is above the warning curve 29, i.e. $\beta_M$ exceeds $\beta_W$, then a signal is generated to activate the warning device 20. The warning signal is fed through a switch 32. The switch 32 is operated by a sensor 34 which determines whether the aircraft is on the ground, and, if so, opens the switch 32 to prevent unwanted activation of the warning device 20.

In an exemplary embodiment of the present invention, the warning device 20 is an electric motor which is connected to an eccentric cam which in turn engages the rudders of the aircraft. In this manner, operation of the electric motor causes the rotation of the eccentic cam against the rudder pedals to produce a conventional rudder shaking action which provides a tactile sensation to the pilot that high sideslip angles are being approached.

What is claimed is:

1. A method for warning a pilot of an aircraft, having a rudder and primary flight control surfaces for generating a rolling moment, of an excessive yaw condition, comprising the steps of:
   a. measuring the aircraft yaw condition by measuring an airflow differential at first and second locations of the aircraft;
   b. converting the measured airflow differential to a measured sideslip angle;
   c. generating values of warning sideslip angle as a function of aircraft airspeed by:
      (1) determining first rolling moments generated about a roll axis of the aircraft when the aircraft is at selected sideslip angles and at selected aircraft airspeeds,
      (2) determining second rolling moments generated about the roll axis in a direction opposite to the first rolling moments by operation-of the aircraft primary flight control surfaces at the selected aircraft airspeeds; and
      (3) selecting the warning sideslip angles from the selected sideslip angles at which the first rolling moments exceed the second rolling moments at the selected aircraft airspeeds;
   d. measuring aircraft airspeed and comparing the measured sideslip angle with the warning sideslip angle corresponding to the measured aircraft airspeed;
   e. generating a final signal when the measured sideslip angle exceeds the warning sideslip angle; and
   f. providing a warning to the pilot in response to the first signal.

2. The method as set forth in claim 1 wherein the second rolling moments are maximum rolling moments generated by operation of the aircraft primary flight control surfaces.

3. The method as set forth in claim 2 wherein:
   a. maximum sideslip angles, $\beta_{MAX}$, are determined to be sideslip angles in wich the second rolling moments are equal to the first rolling moments; and
   b. the warning sideslip angles, $\beta_W$, are sideslip angles which are less than the maximum sideslip angles by amounts equal to $\Delta \beta$.

4. The method as set forth in claim 3 wherein:
   a. the first rolling moments are determined from aircraft test data measured at selected aircraft airspeeds and selected sideslip angles; and b. the second rolling moments are determined by aircraft test data measured at the selected aircrafts airspeeds.

5. The method as set forth in claim 4 wherein $\Delta\beta$ is determined as a function of aircraft airspeed.

6. The method as set forth in claim 1 wherein the airflow differential is measured by measuring a difference in air pressure at the first and second locations of the aircraft.

7. The method as set forth in claim 1 wherein the warning is provided to the pilot by vibrating cockpit controls which operate the rudder.

8. Apparatus for warning a pilot of an aircraft having a rudder and other primary flight control surfaces, of an excessive yaw condition, comprising:
   a. means for measuring the aircraft yaw condition by measuring an airflow differential at first and second locations of the aircraft;
   b. means for converting the measured airflow differential to a measured sideslip angle;
   c. means for generating values of warning sideslip angle as a function of aircraft airspeed, the generating means including:
      (1) means for determining first rolling moments generated about a roll axis of the aircraft when the aircraft is at selected sideslip angles and at selected aircraft airspeeds,
      (2) means for determining second rolling moments generated about the roll axis in a direction opposite to the first rolling moments by operation of the aircraft primary flight control surfaces at the selected aircraft airspeeds, and
      (3) means for selecting the warning sideslip angles from the selected sideslip angles at which the first rolling moments exceed the second rolling moments at the selected aircraft airspeeds;
   d. means for measuring aircraft airspeed and for comparing the measured sideslip angle with the warning sideslip angle corresponding to the measured aircraft airspeed;
   e. means for generating a first signal when the measured sideslip angle exceeds the warning sideslip angle; and
   f. means for providing a warning to the pilot in response to the first signal.

9. The apparatus as set forth in claim 8 wherein said airflow differential measuring means includes means for measuring a difference in air pressure at the first and second locations of the aircraft.

10. The apparatus as set forth in claim 9 wherein the warning means includes means for vibrating cockpit controls which operate the rudder.

11. A method for providing a warning signal in an aircraft, having flight control surfaces for generating a rolling moment about an axis of the aircraft, of an excessive yaw condition, the method comprising the steps of:
   a. measuring yaw conditions of the aircraft while airborne and generating a first output of aircraft sideslip angles as a function of the measured yaw conditions;
   b. generating values of warning slideslip angles as a function of aircraft airspeed by determining projected rolling moments of the aircraft when the aircraft is at projected sideslip angles and projected aircraft airspeeds, the warning sideslip angles including those sideslip angles at which the projected rolling moments of the aircraft will equal or exceed a maximum counteracting rolling moment which can be generated by the aircraft flight control surfaces;
   c. comparing the measured sideslip angles with the warning sideslip angles; and
   d. generating the warning signal when at least one of the first output sideslip angles equals or exceeds the warning sideslip angles.

12. The method as set forth in claim 11 wherein the rolling moments are generated due to a dihedral effect which results from yawing of the aircraft while it is airborne.

13. A method for providing a warning signal in an aircraft, having flight control surfaces for generating a rolling moment about an axis of the aircraft, of an excessive yaw condition, the method compising the steps of:
   a. measuring yaw conditions of the aircraft while airborne and generating a first output of aircraft sideslip angles as a function of the measured yaw conditions;
   b. generating values of warning slideslip angles as a function of aircraft airspeed by
      (1) determining first rolling monents generated about the roll axis of the aircraft when the aircraft is at selected sideslip angles and at selected aircraft airspeeds.
      (2) determining second rolling moments generated about the roll axis in a direction opposite to the first rolling moments by operation of the aircraft flight control surfaces at the selected aircraft airspeeds, and
      (3) selecting the warning sideslip angles from the selected sideslip angles at which the first rolling moments equal or exceed the second rolling moments at the selected aircraft airspeeds;
   c. comparing the first output sideslip angles with the warning sideslip angles; and
   d. generating the warning signal when at least one of the first output sideslip angles equals or exceeds the warning sideslip angles.

* * * * *